April 7, 1925.  1,532,634
J. R. OLIVER
STOPPING AND STARTING MECHANISM FOR SHOE STITCHING OR OTHER MACHINES
Filed Oct. 23, 1923  6 Sheets-Sheet 1

J. R. OLIVER 1,532,634

STOPPING AND STARTING MECHANISM FOR SHOE STITCHING OR OTHER MACHINES

Filed Oct. 23, 1923    6 Sheets-Sheet 3

J. R. OLIVER 1,532,634

STOPPING AND STARTING MECHANISM FOR SHOE STITCHING OR OTHER MACHINES

Filed Oct. 23, 1923   6 Sheets-Sheet 4

John Roger Oliver, Inventor,
by Rogers, Kennedy & Campbell,
Attorneys.

April 7, 1925.  1,532,634
J. R. OLIVER
STOPPING AND STARTING MECHANISM FOR SHOE STITCHING OR OTHER MACHINES
Filed Oct. 23, 1923   6 Sheets-Sheet 5

John Roger Oliver
Inventor,
by Rogers, Kennedy & Campbell
Attorneys

April 7, 1925.

J. R. OLIVER

1,532,634

STOPPING AND STARTING MECHANISM FOR SHOE STITCHING OR OTHER MACHINES

Filed Oct. 23, 1923   6 Sheets-Sheet 6

John Roger Oliver
Inventor,
by Rogers, Kennedy & Campbell
Attorneys.

Patented Apr. 7, 1925.

1,532,634

UNITED STATES PATENT OFFICE.

JOHN ROGER OLIVER, OF MEDFIELD, MASSACHUSETTS, ASSIGNOR TO REECE SHOE MACHINERY COMPANY, OF BOSTON, MASSACHUSETTS, A CORPORATION OF MAINE.

STOPPING AND STARTING MECHANISM FOR SHOE-STITCHING OR OTHER MACHINES.

Application filed October 23, 1923. Serial No. 670,279.

*To all whom it may concern:*

Be it known that I, JOHN ROGER OLIVER, a citizen of the United States, residing at Medfield, in the county of Norfolk and State of Massachusetts, have invented certain new and useful Improvements in Stopping and Starting Mechanism for Shoe-Stitching or Other Machines, of which the following is a specification, reference being had therein to the accompanying drawing.

This invention is a novel stopping and starting mechanism for shoe stitching or other machines, and is shown applied, as an example, to the so-called outsole stitching machine, by which the outsole and welt of a shoe are stitched together, although the invention is applicable to various other types of power driven stitching machines, such as the well known button hole sewing machine, and other machines wherein it is required to bring the main or operating shaft to rest in a definite position without undue shock.

The main object of the present invention is to afford a stopping and starting mechanism which will be more efficient in the respects already mentioned and more convenient, durable and reliable in operation. Although many stopping and starting mechanisms have been tried upon power driven shoe stitching machines I believe that nothing has heretofore proven entirely satisfactory. The original method of hand stoppage is in consequence still practised to a considerable extent, this consisting in placing the hand upon the shaft hand wheel, bring the same to a stop, and then turning or advancing the wheel until the shaft is in the desired final position. The mode of stopping a shaft by a simple friction brake is ideal as regards the avoidance of shock, but as this does not give a uniform action nor a definite stopping point it has never been adopted for shoe stitching machines. It is an object of the present invention to secure the advantages inherent in the friction brake without incurring the disadvantage of the indefinite stopping position. The plan has been tried of braking down the speed by friction to a certain slow speed and thereupon continuing the rotation by means of a slow speed drive, eventually thrown out upon the final stoppage, as illustrated in the expired patent of Richardson No. 710,612, and the later cam controlled stopping mechanism of the Goodyear Patent No. 818,159; these however involving complication or uncertainty and not attaining the full advantage of the simple friction brake.

I believe the present invention to attain the advantages of the several prior mechanisms above mentioned without incurring the disadvantages thereof.

Other and more particular objects and advantages of the present invention will be explained in the hereinafter following description of one form or embodiment of the invention, or will be apparent to those skilled in the art.

To the attainment of the objects and advantages referred to the present invention consists in the novel machine, mechanism, combinations, arrangements, devices and other features herein described or illustrated.

In the accompanying drawings, forming a part hereof.

In Figs. 1 to 5 the parts are shown in their final stopped position.

While the essence of the invention is to be set forth in the appended claims, its general preferred mode of operation may be preliminarily stated to advantage. In one aspect the invention may be described as follows. When the time to stop, or the end of the seam, has been reached, the pedal or cam or other controlling member operates to put the stopping mechanism into effect. For illustration a pedal is shown, which is held down during stitching, and when the pedal is let up this operates to unclutch the operating or stitching shaft from the power drive. A suitable brake or other friction is thereupon applied and allowed to remain in effect until the stoppage of the shaft. This of course may be adjusted to stop the shaft in as short a time as desired and the stoppage will be without shock. The stopped position, however, will be wholly indeterminate. After such stoppage, according to this invention, the shaft is to be turned over slowly to the desired final stopping position. This separate or supplemental action is preferably caused to take place by reason of the reaction of the parts which have been placed under strain during the frictional stopping action. The slight reverse rotation or kicking back of the shaft, due to the cessation of the frictional drag after the strain or the yield of the parts, is utilized to operate or trip a latch, trigger or switch. This in turn sets in operation the mechanism or means which operates to turn the shaft slowly up to the final stopping position. The conclusion of this action is preferably a positive stoppage by the contact or impact of a dog or projection on the rotating parts with a cooperating fixed stop or dog, thus giving the exact desired final stopped position.

The machine illustrated in the drawings as an example is a shoe stitching machine of the class mentioned having a heavy base casting 14 above which extends an upright post 15 carrying at its top a head or frame 16 which supports the stitching mechanism as is usual in such machines. On the base is shown a source of power in the form of an electric motor 17 having a pulley 18 for main driving purposes, connected by a belt 19 to the mechanism at the top of the machine. A second pulley 20 is shown on the motor shaft, this operating through a belt 21 extending to the means for turning the shaft slowly over to the desired position after the main drive has been thrown out and the shaft stopped. The base also gives support to a controlling lever or pedal 22 normally lifted by a spring 23 but held down by the foot of the operator during stitching, a pedal rod 24 extending from the pedal to the mechanism at the top of the machine to be controlled thereby.

The operating or stitching shaft 25 is shown as having a hand wheel 26 at its left end, as is usual. Also the usual stitching instruments may be employed, although they are not here fully shown because forming no essential part of the present invention. However, there is shown the curved needle 27, used in this type of machine, this being seen in Fig. 1 as fully retracted. It is supposed to cooperate with a shuttle in the formation of lock stitches, the details of all of which may be ascertained by reference to previous patents and are understood to those skilled in the art. The needle is shown mounted on a toothed swinging carrier 28 which is oscillated through a curved rack 29 mounted at the forward end of a rock lever 30 which is fulcrumed at the rear and carries a follower 31 engaging a cam groove 32 formed in a cam of the usual sort mounted on the stitching shaft 25. During the stitching the shoe or other work may be held between the work engaging members 33.

Figure 1:
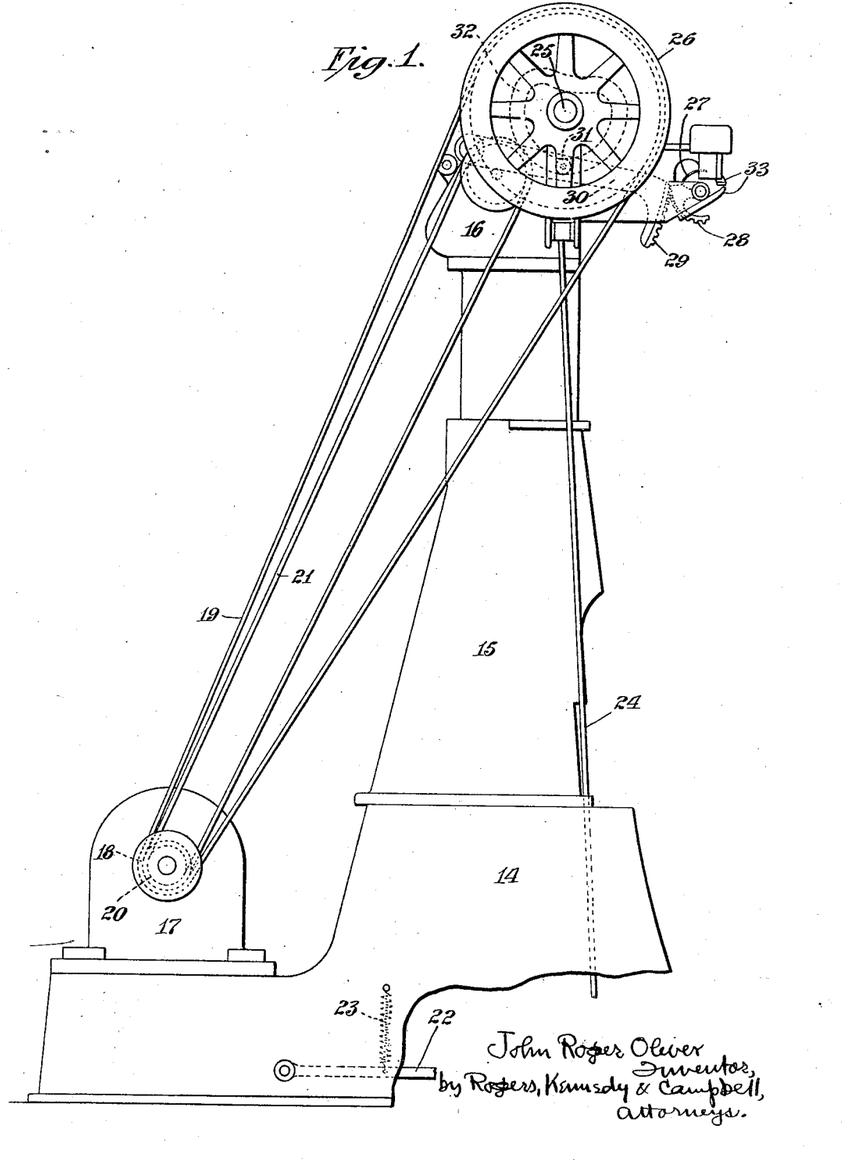
Fig. 1 is a general left elevation of a shoe stitching machine of the kind referred to and embodying the stopping and starting mechanism of the present invention.

The described elements 14 to 33 are all shown in Fig. 1. The more particular description of the present invention requires reference to the detail Figs. 2 to 11. The motor 17 may have a rotary speed of 1760 R. P. M. such that through the belt 19 a stitching speed of 450 stitches or more per minute would result, while the slow connections operated by the belt 21 may turn the shaft at the negligible speed of 50 R. P. M. in bringing it to final position.

Figure 2:
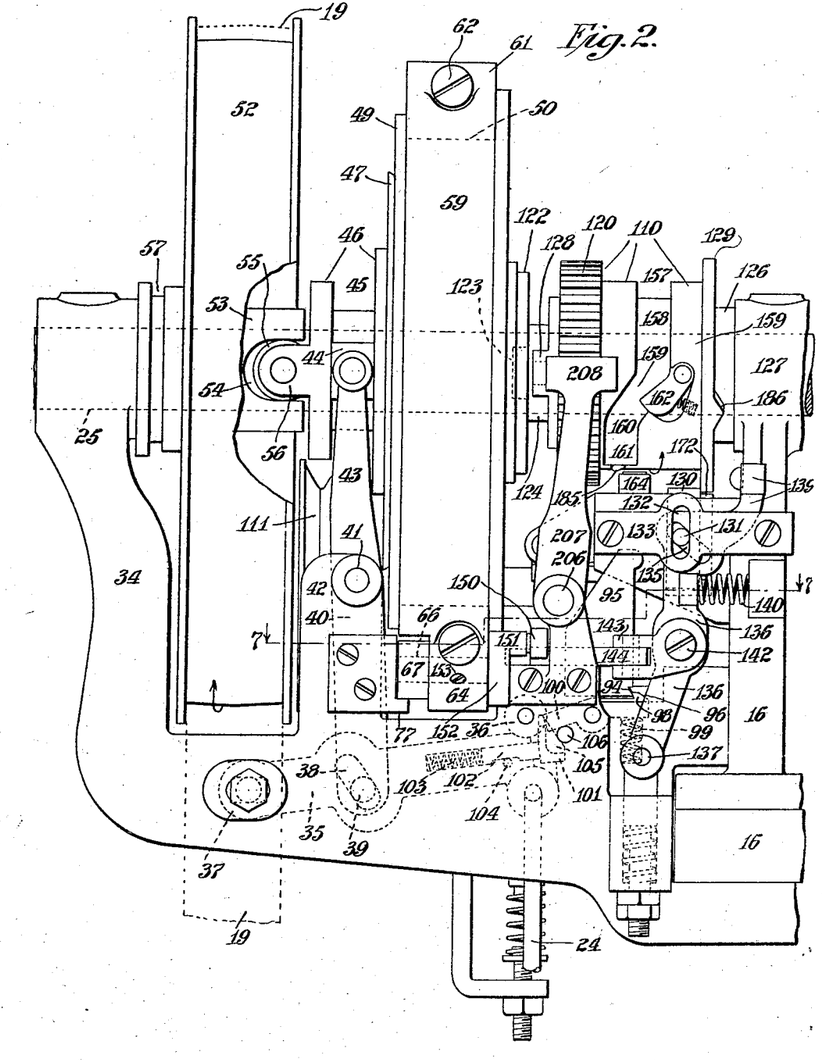
Fig. 2, on a larger scale, shows a front elevation of the particular part of the machine embodying the stopping means of this invention.

When the pedal or pedal rod are fully or partly depressed they may have the function of regulating the running speed so that the stitching can be quickened or slowed down, the proper manipulation of the pedal admitting more or less slippage to the main driving clutch, to be described. When, however, the pedal is let entirely up the function of this invention is to throw open the main clutch, thus discontinuing the drive, and to cause a suitable friction or brake to be applied for stopping the stitching shaft. Fig. 2 shows that the pedal rod 24 at its upper end is connected to certain mechanism mounted on the fixed bracket 34, the extremity of which also forms a bearing for the operating shaft 25. The pedal rod is connected to the free end of a swinging lever 35. The upward movement, as the pedal is raised by the spring 23, is limited by a stop 36 shown in the form of a spool, which is contacted by the upper corner of the lever 35. The lever is fulcrumed at 37 with a slotted mounting to permit longitudinal adjustment of the lever.

The driving clutch and the connections for controlling it will now be described. The lever 35, moved up and down under control of the pedal, is provided with an inclined cam or slot 38 which is engaged by a follower or pin 39 mounted at the lower end of an upright lever 40 centrally pivoted at 41 to a fixed extension bracket 42 upstanding from the bracket 34. The upper end of the lever 40 is formed with a fork 43, the ends of which are pivoted to opposite blocks 44 engaged in the groove 45 of a hub 46. This hub is a part of the clutch member or cone 47 which fits within the opposing cone 48, formed in the disk 49, keyed to the shaft 25. By this arrangement the movement of the pedal while depressed keeps the driving cones 47 and 48 engaged with varying pressure so that, according to the pressure and slippage, the driving speed may be varied. When the pedal is let up entirely this wholly removes the interior or driving cone 47 from the opposing clutch member, and the drive ceases.

The disk or member 49 is utilized not merely as one of the cooperating clutch members, containing the cone 48, but also as a part of the frictional braking device, for example the disk having a peripheral surface 50, engaged by the brake strap or band to be described.

The driving power is transmitted to the interior cone member 47 of the main clutch, and thereby to the stitching shaft 25, by any desired connections, such as the following. Rotating loosely on the stitching shaft is what may be termed the drive pulley 52, this being a hollow structure with a flat rim adapted to receive the belt 19 extending from the driving motor at the base. The interior hub 53 of the drive pulley is formed with a pair of opposite slots 54, extending axially, and each engaged by a roll 55 mounted on projections 56 at the left side of the hub 46 as viewed in Fig. 2. In this way the rotation of the drive pulley is constantly transmitted to the hub 46 and to the interior clutch cone 47 which is integral therewith, so that when the clutch cones are forced into engagement the driving power is transmitted to the stitching shaft.

Figure 3:
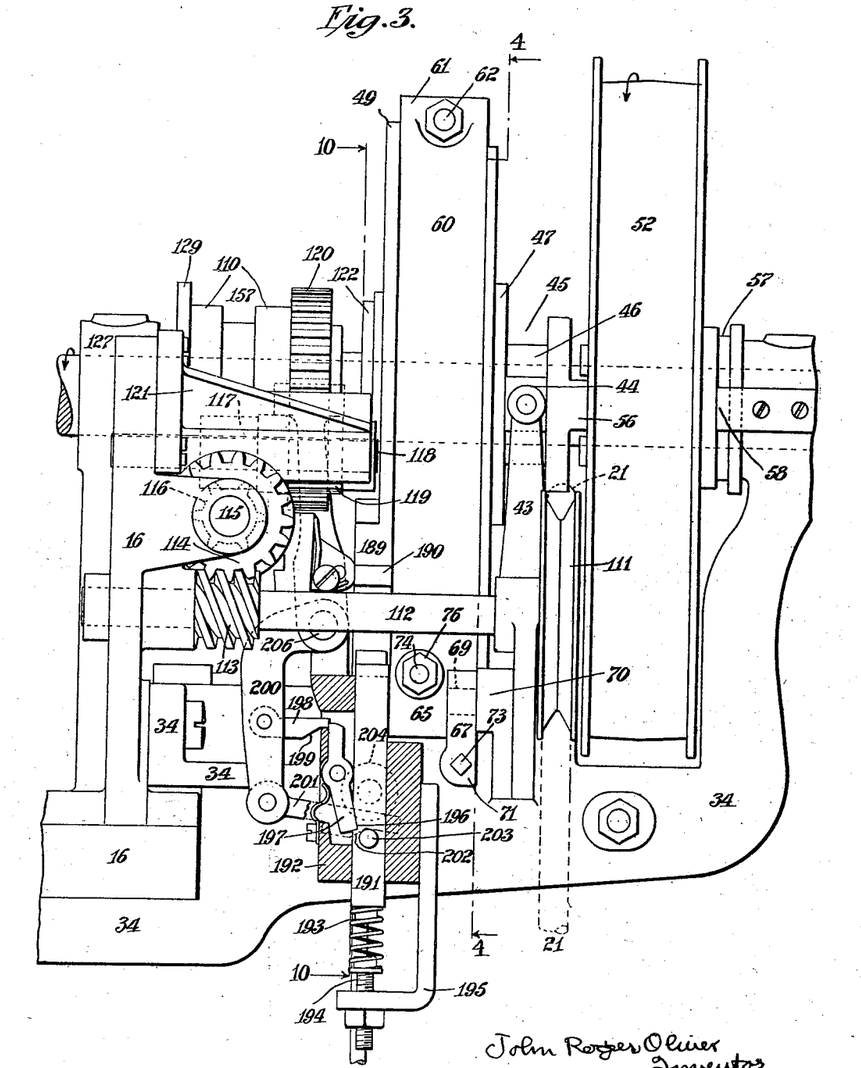
Fig. 3 is a rear elevation taken partly in section on the line 3—3 of Fig. 10.

In order to hold the drive pulley 52 in its proper axial position, it is shown formed with an exterior hub at the right, grooved at 57, so as to be engaged by fixed fingers 58, as seen in Fig. 3.

The friction for bringing the stitching shaft to a stop when the drive is unclutched and the pedal let fully up may be brought about through a brake, and herein is shown such a brake consisting of a front member or strap 59 and a rear member or strap 60, cooperating in the application of frictional pressure to the peripheral surface of the clutch-and-brake member or disk 49 which is keyed to the stitching shaft. Each strap member 59 and 60 is shown as having a lug 61 at its top part and these lugs are connected by a bolt 62 extending through them, with a spring 63 surrounding the bolt to hold the lugs apart. The front brake strap 59 has a lug 64 at its lower portion and the rear strap 60 has a lower lug 65, these two lugs 64 and 65 taking part in the actions by which the braking pressure is applied and removed, a toggle construction being used for this purpose, as will be described, the straightening of the toggle operating to separate the lugs 64 and 65 to remove the friction, while the breaking of the toggle permits the lugs to be forced together by a brake spring, as will be described.

Figure 4:
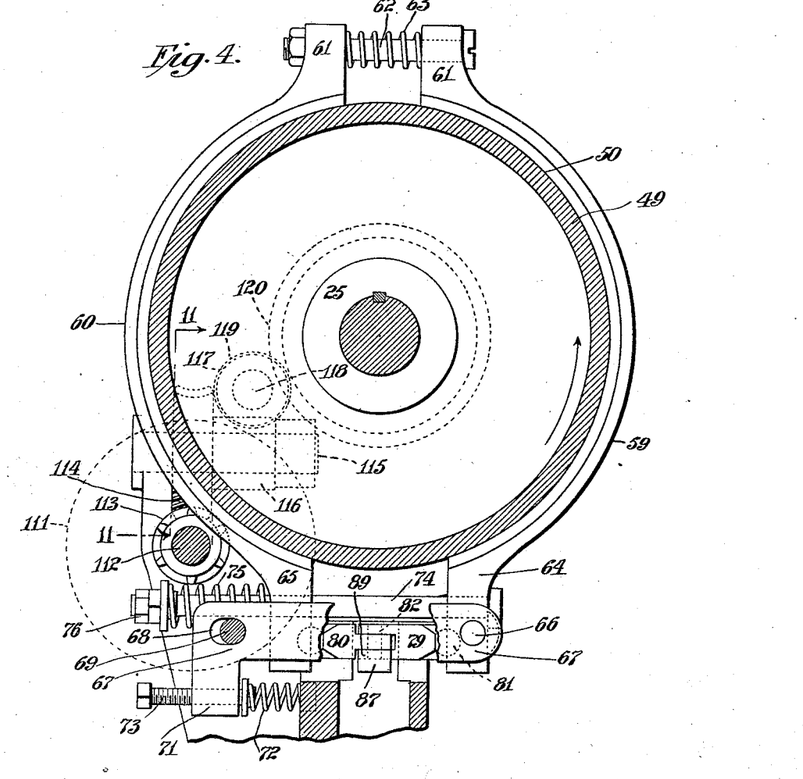
Fig. 4 is a partial left elevation taken partly in section on the line 4—4 of Fig. 3.

The lower lug 64 of the front brake strap is shown as connected by a pin 66 with a member or bar, which may take any suitable form, but which is shown in the form of a bar extending fore and aft, the lug 64 being pinned to the bar as stated and the lug 65 arranged in sliding contact with the side of the bar. It will be seen that the brake bar 67 bridges across from lug to lug, forming, in a sense, a supporting means for the brake mechanism, the bar, the lugs and the toggle and spring to be described, being operatively associated for the purposes hereof. The brake bar 67 might be substantially fixed against fore and aft play or movement if the brake were to have no unusual function, but as already stated it is preferred that there shall be a slight yield of the parts during the braking action, and by reason of the drag thereof, so that the restoration of the parts, after the cessation of rotation, can be utilized to initiate the subsequent action of slowly turning over the shaft from the indeterminate stopped position caused by the brake to the desired final position. For this purpose the brake bar 67 is shown formed with a slightly elongated slot 68 engaging a fixed pin 69 extending from the fixed bracket 70 integral with the main bracket 34. The pin 69 forms a support to the rear end of the brake bar, and as stated permits a slight forward yielding of the bar during the braking action, affording a stop preventing more than a slight yielding movement, and permitting the parts to be restored to normal, as seen in Fig. 4, as soon as the frictional drag ceases. In order to hold the brake bar 67 and the brake mechanism in the normal position illustrated the bar is shown as formed with a lug 71 extending downwardly and acted upon by a spring 72 which presses it rearwardly into normal position, a bolt 73 passing through the lug 71 and serving for the adjustment of the spring pressure. From this description it will be observed when the braking pressure is applied, the rotary drag upon the brake band, which is counter-clockwise in Fig. 4, will displace the brake band and associated parts toward the right or front, the spring 72 yielding; whereas as soon as the rotation ceases, and the drag ceases, the spring 72 reasserts itself and throws the brake bar rearwardly to the small extent permitted by the elongated slot 68 engaging the fixed pin 69. This reaction or throwback of the parts is utilized, as will be described, for the initiation of the supplemental action of turning over the shaft to the desired final position.

It has been stated that the braking pressure is preferably applied by a spring arranged to draw together the lugs 64 and 65 at the lower ends of the front and rear brake straps. For this purpose a bolt 74 may be passed through the two lugs, with a strong spring 75 at the exterior of the rear lug, the bolt being headed at the front end and provided at the rear end with adjusting lock nuts 76 to confine the spring under any desired pressure. Whenever the lugs 64 and 65 are not held apart by the toggle to be described, the spring 75 throws them forcibly together, giving the desired braking pressure.

The braking pressure and the effectiveness of the brake can be controlled by increasing or decreasing the tension or spring 75 by means of the lock nuts 76. After approximately correct adjustment has been made the nut of the bolt 62 at the top of the brake strap members may be tightened or loosened for quick adjustment.

Figures 6, 7, 8, 9:
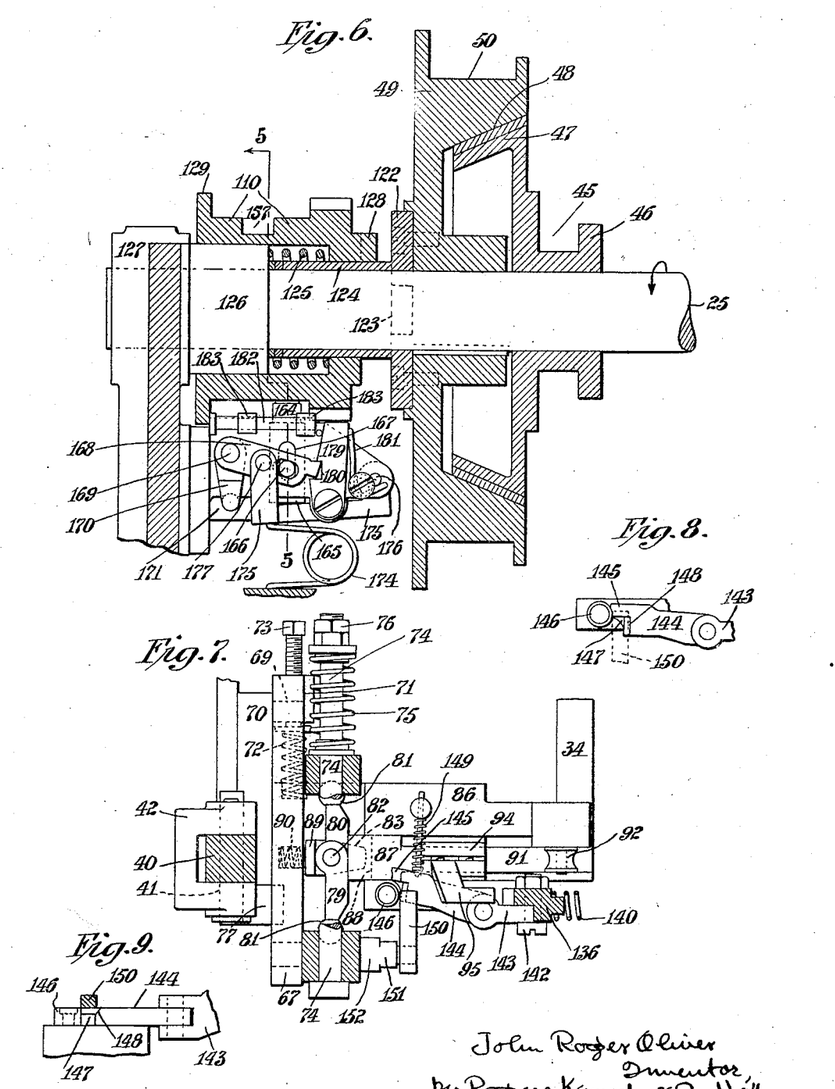
Fig. 6 is a rear elevation and section on a central vertical longitudinal plane, the parts shown in a position prior to the final stoppage.
Fig. 7 is a plan view and section on the line 7—7 of Fig. 2.
Fig. 8 is a plan view of certain details of Fig. 7, shown in a different stage or position.
Fig. 9 is a front elevation of the parts seen in Fig. 8.

It has been stated that the brake bar 67 is held up at its rear end by the fixed pin 69 sliding in the slot 68. The front end of the brake bar may be held up by a ledge 77. This is a fixed ledge projecting to the right from the fixed bracket 42 and is seen in Figs. 2 and 7, it being omitted from Fig. 4 because the supported portion of the brake bar is broken away in this figure. By such support of the brake bar at its front and rear ends, proper support is given to the brake straps 59 and 60, which are of considerable weight, and are required to be held up closely into contact with the disk 49.

To remove the braking pressure a toggle may be employed as already stated, this toggle being shown in its straightened condition, thus removing the braking pressure, but being in readiness to be released following the let up of the pedal after further stitching operations. The toggle is best shown in Figs. 4 and 7 and consists of a front toggle lever 79 and a cooperating rear lever 80, each having a spherical head 81 engaging in a corresponding recess in the lug 64 or 65. The toggle levers are preferably pivoted together by a vertical pin 82 and one of them, the rear toggle lever 80, is shown as having a flat horizontal lug 83 by which the parts are kept in their proper horizontal relation.

The toggle opening and closing device will next be described. Guided in a fixed portion 86 of the bracket 34 is a bar or slide 87 adapted to move to the right or left and thereby to open and close the toggle. This toggle bar is best seen in Fig. 7. At its left end it is formed with a flat slot at 88 in which plays the flat lug 83 on one of the toggle levers. The toggle bar or slide 87 extends to the left beneath the toggle levers and is there provided with an upstanding flange or lip 89 in position to engage one of the toggle levers at that side. Thus when the toggle bar is moved to the left the toggle is straightened, but when moved to the right the flange 89 opens or breaks the toggle. A light spring 90 is shown, located in a recess in the brake bar 67, arranged to press toward the right against the flange 89, so that the toggle will open readily when not held in its closed or straightened position. Obviously when the toggle bar 87 is not exerting leftward pressure, the spring 90 will start the breaking of the toggle, following which the strong brake spring 75 is able to throw the brake strap lugs together and thereby apply the brake.

The toggle bar or slide 87 is shown provided with a rightward extension or shank 91, which is guided beneath a roll 92, that takes the pressure when the bar is being operated to straighten the toggle. The shank 91 is cylindrical and it has adjustably attached to it a sleeve 94, which is split, and secured in place by screws. This sleeve has an upward extension 95 by which the slide is actuated and a downward extension 96 affording a hook or shoulder by which the parts may be latched or locked in position with the toggles straight and the brake removed. As shown in Fig. 2 a pivoted catch 98 may be employed, engaging the hook or shoulder 96 to hold the parts in this position. The catch 98 is acted upon by a spring 99. Beyond its pivot the catch is formed with a tail 100, adapted to be thrown up for releasing the catch, when the brake is to be applied. For lifting the latch tail to effect such release a finger 101 is shown mounted at the right end of the lever 35 which is controlled by the pedal rod. When the pedal is let up completely the releasing finger 101 lifts the tail 100, thus depressing the catch 98 and allowing the brake to be applied. It is desirable that the catch should be at once rendered operative and for this purpose the release finger is movably connected upon the pedal control lever 35. The shank 102 of the finger slides in the lever and is pressed outwardly to the right by a spring 103. A pin 104 limits the sliding movement of the shank. The release finger is provided with a cam surface 105 which, in the upward movement, after the finger has opened the catch, is adapted to contact against a fixed pin 106, which cams the finger to the left, disengaging it from beneath the catch, so that the catch is restored, not to be rendered operative again until after the pedal has been again depressed and let up.

The mechanism thus far described takes care of the stoppage to the extent that when the pedal is let up this unclutches the drive and trips the catch 98 so as to permit the toggle to open and the brake to be applied, the brake slowing down and actually stopping the stitching shaft. During the slowing down the braking parts yield through the compression of the spring 72 and when the actual stoppage occurs the spring throws the parts back, thus giving the reaction which is herein utilized to initiate the further operations. Generally speaking the further operations, controlled by a certain trigger or latch, consists in the shifting of a member, herein termed a drum, which operates as a slow rotating clutch and also as a control cam, with the result that the friction brake is opened by the straightening of the toggle, the slow rotation drive means is clutched or engaged, and the drum cam becomes operative for the further control, consisting in disengaging the slow rotary connections at a definite time, permitting the shaft to be finally stopped in the desired position; the cam preferably also giving control of a final impact stop member, insuring an exact final shaft position, and serving also to restore the final stop device, the trigger and the various other latches and devices taking part in the action.

The clutch-and-cam member, cylinder or drum 110 is shown mounted loosely upon the stitching shaft at a point to the right of the disk 49, as best seen in Fig. 2 and in the rear views Figs. 3 and 6. This drum member is also capable of sliding motion along the shaft for the purpose of engaging and disengaging the slow rotation means and effecting other operations. The drum is constantly rotated at a slow speed, for example, 50 R. P. M. and preferably in the same direction as the regular rotation of the shaft, although in some cases the direction might be reversed to advantage.

The connections for slowly turning the drum 110 may be as follows. The belt 21 extending from the motor on the machine base passes around a pulley 111, see Fig. 3. This pulley is attached to a longitudinal shaft 112 which carries a worm 113 engaging a worm wheel 114 on a shaft 115 below and at right angles to the stitching shaft. A helical gear 116 on the shaft 115 is engaged with a complemental helical gear 117, mounted on a shaft 118 which extends leftward (to the right in Fig. 3) to where it carries a pinion 119 directly engaging a gear 120 formed or mounted on the drum. The shaft 118 is journaled in a special bracket 121. The described connections constitute a reducing gear giving a speed which is a small fraction of the full speed of the stitching shaft. The drum 110 is constantly turning and standing ready to pick up the stitching shaft at an indeterminate point and carry it to the desired final position. This may be done in various ways, for example by a cone clutch, like the clutch 47, 48, giving immediate engagement; but for some purposes, a positive or dog clutch engagement is preferable, and such will now be described.

Figures 10, 11:
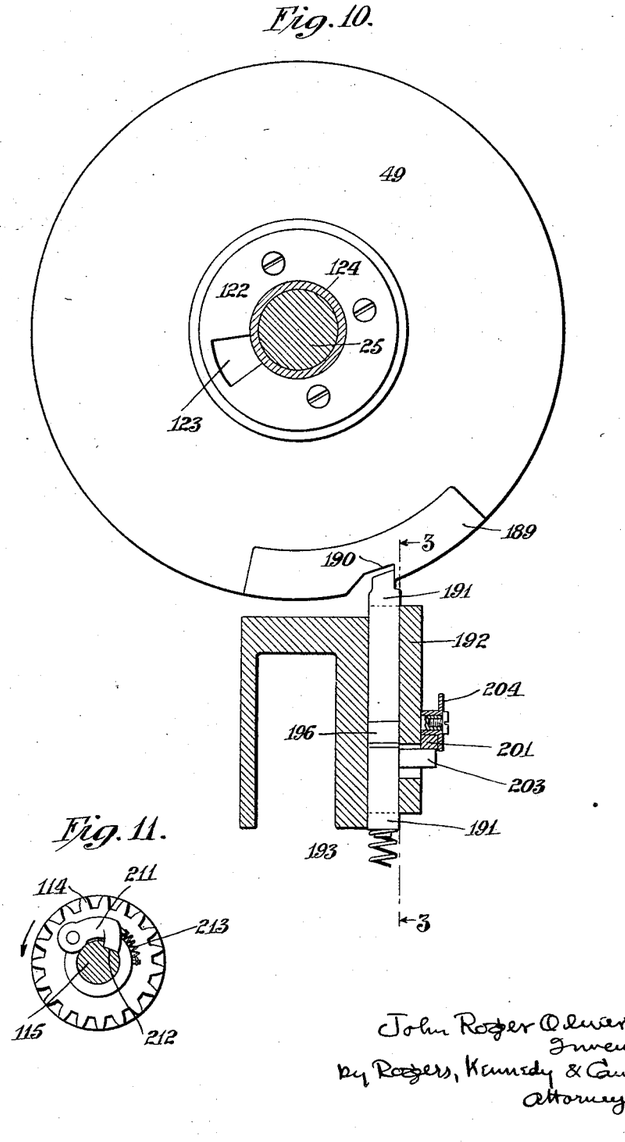
Fig. 10 is a right elevation and section on the line 10—10 of Fig. 3.
Fig. 11 is a detail shown in rear elevation on the plane 11—11 of Fig. 4.

The slow rotating connections may be as follows. Keyed to the shaft 25, or secured to the disk 49 is a clutch member 122 in the form of an annular plate having a recess 123. This is best seen in Figs. 2, 6 and 10. This annular member is shown as having a sleeve 124 extending toward the right into the hollow interior of the drum 110 where it is surrounded by a spring 125 operating to press the drum to the left (to the right in Fig. 6), the spring at its other end bearing against a fixed sleeve 126 mounted on the bearing or bracket 127 upon which sleeve a portion of the drum rotates and slides. The spring thus tends to press the drum to the left and cause the engagement of a clutch, dog or lug 128 thereon with the recess 123, whereby the shaft is slowly turned as described.

The drum 110 is shown retracted or to the right, with the slow clutch members 123, 128 disengaged and the drum held in this position through its peripheral flange 129, in cooperation with a guard 130. This is the normal condition of the parts, the drum slowly rotating and held to the right by the flange bearing against the guard. The withdrawal of the guard, the slow clutching action, and the restoration of the parts will be later described.

The guard 130 consists of a vertically sliding block fitted in a fixed part of the head and having a forwardly projecting pin 131. The guard is moved down or up through this pin, which operates in a vertical slot 132, formed in a fixed bridge or cross piece 133. For the purpose of moving the guard 130 down and up there is shown a cooperating cam or slot 135 formed in a swinging lever 136 fulcrumed at 137. When the lever swings the inclined slot 135 cams the pin and guard up or down. The lever 136 has an upward offset extention 139 cooperating with the annular flange 129 of the drum, as will be later explained. A strong spring 140 is arranged to throw the lever to the left, thus tending to depress the guard and release the drum to move to the left. The lever 136 at a point between its fulcrum and the cam slot is provided with a pivot 142, from which extends a short link 143, to which in turn is pivoted a member 144 extending horizontally to the left and which constitutes the trigger or latch or device through which the frictional stoppage of the shaft controls the subsequent operations.

The trigger or latch 144 is seen in Fig. 2 and in plan view in Fig. 7, with the trigger sprung or released, Fig. 8 showing the same reset, and Fig. 9 a front view of the parts seen in Fig. 8. The trigger has beyond its body a leftward extension 145 which bears against the periphery of a roller 146, this giving a delicate device by which the slightest displacement of the trigger rearward causes it to pass off the roller from the Fig. 8 position to the Fig. 7 position. The trigger is formed with a curved web 147 which engages upon the roller to stop the leftward movement of the parts under the influence of the spring 140, and serves another purpose as will be explained. The trigger also has a cam surface 148. A spring 149 presses forwardly upon the trigger, tending to hold it in set position as in Fig. 8.

Cooperating with the trigger 144 is a pawl or finger 150. This is mounted on a post 151 having a base 152 which can swing for adjustment, this base being mounted on the pin 66 as seen in Fig. 2, a set screw 153 serving to fix the pin, the base and the post when adjusted. The pin 66 passes through the downward lug 64 of the front brake strap. It has already been explained how these parts yield during the braking and then react. This reaction carries the lug 64 and therefore the pawl or finger 150 rearwardly, following instantaneously the actual stoppage of the shaft by the brake. This rearward movement of the pawl 150 displaces the trigger from the set position of Fig. 8 to the sprung position of Fig. 7, as clearly indicated by these figures. When the pawl has pushed the trigger rearwardly and the trigger is thrust to the left by the spring 140, the cam surface 148 elevates the pawl to the level of the upper side of the trigger.

This springing or releasing of the trigger enables the spring 140 to throw the upright lever 136 to the left. This causes the depression of the guard 130, as already described. In this action the lever 136 also strikes against the upward extension 95 of the toggle bar 87 so as to thrust the latter to the left, thus straightening the toggle and releasing the brake. This action, however, is somewhat controlled or timed by the fact that the lever 136 has the upward extension 139, before referred to, which is restrained by the annular flange 129 of the drum 110.

There has now been described how, after the stoppage of the shaft, the throwback of the parts springs the trigger so as to release certain devices which operate to remove the brake and to release the drum, which drum controls the subsequent actions as will next be described.

The drum 110 is a cylindrical member rotatable and slidable upon the stitching shaft, carrying the gear 120 by which it is slowly turned, also carrying the dog or lug 128 by which slow rotation is transmitted to the shaft, also carrying the flange 129 by which its own movements are restrained by the guard 130. The drum is thrown to the left as viewed in Fig. 2, by its own interior spring, when the guard releases it, but the restoration or return movement of the drum is effected by a peripheral cam 157 formed in the drum itself. This cam is sufficiently seen in Fig. 2, in connection with the cross section Fig. 5. The major portion of the cam is a dwell 158, the entrance to which is a gentle incline. The cam then has a slanting portion 159 followed by a second dwell 160 and then an elevating incline 161 by which the follower is forced out of the groove. Adjacent the slanted portion 159 is a spring guard 162, preventing the follower from dropping into abrupt action with consequent wear of the parts.

Figure 5:
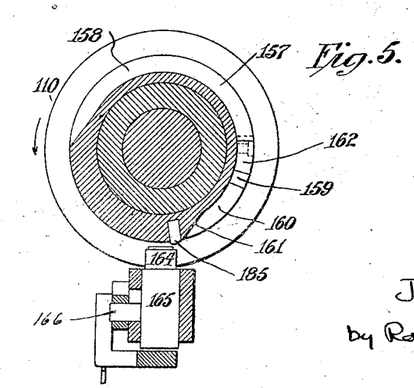
Fig. 5 is a partial left elevation and section taken on the line 5—5 of Fig. 6.

The follower for the cam 157 is a roll 164 shown in Figs. 2, 5 and 6. This is normally held down but is released to rise after the slow turning clutch is engaged, so that the follower, cooperating with the cam, may force the drum back to its original position, thus disengaging the slow turning clutch and effecting other control to be described. The roll is on a bolt 165 fitted to slide vertically in a fixed part of the frame. The bolt has a laterally projecting pin 166, as seen in Fig. 6 by which it is actuated. This pin moves up and down in a fixed slot 167 and is engaged by a slotted lever 168. Referring to Fig. 6 the left end of this lever is mounted on a floating fulcrum 169 at the top of an upright link 170, the lower end of which bears on a member 171 which is not fixed but is in the nature of a slide capable of yielding downwardly. The upper end of this member 171 constitutes a guard 172, supplemental to the guard 130, and adapted to hold the drum, at certain times, further to the right than it is held by the guard 130, as seen in Fig. 2. The lifting spring 174 in Fig. 6 forces upwardly the lever 168, bolt 165 and part 171. The spring acts through the lever 175, which is fulcrumed at 176 and extends downwardly and then horizontally and then up to its pivot point 177 on the follower lever 168. When the follower is depressed it is there held by means of a notched latch 179, consisting of a lever with a deep notch 180 acting not only to hold down the extremity of the follower lever as shown, but acting also as a fulcrum to said lever, as will be explained. The notched lever 179 is held in position by a spring 181. It is adapted to be swung against the spring by an unlatching pin 182, the head of which is contacted by the drum flange 129, this pin being mounted in fixed guides 183. As a part of the action of the follower, when it is thrust down by the final portion of the cam groove, the lever 168 is brought to the latching position shown in Fig. 6. At the exit of the cam is shown a slight projection or button 185 which throws the follower slightly further down. The follower pin 166 depresses the lever 168. The notch 180 acts as a fulcrum. The floating pivot 169 is therefore forced down and this depresses the member 171 and the guard 172 so that the drum flange 129 is released by the guard and allowed to take its normal position against the guard 130, as seen in Fig. 2.

The final stopping or impact means may comprise an impact member 191 mounted at the side of the disk 49 as seen in Fig. 10, having a peripheral notch 190. This, at the proper time, engages an impact bar 191 mounted in a fixed frame member 192. The bar is normally held down but a spring 193 tends to lift it. An adjusting screw 194 regulates the tension of the spring, see Fig. 3, this screw or bolt mounted at the lower end of a bracket 195. The bar has a notch 196 at one side engageable by a spring latch 197 which holds the bar down. A finger 198 is arranged to press upon the latch to release the impact bar. This finger has an inclined under surface 199 by which the finger is cammed up on being thrust to the right, in Fig. 3. These parts are controlled by a rock arm 200 carrying the finger 198 and having a bar 201 with a cam surface 202 for depressing the impact bar, the latter having a pin 203 for this purpose, and the bar 201 passing between this pin and a flanged roller or spool 204 as a bearing. The rock arm 200 is fulcrumed at 206, this fulcrum consisting of a rock shaft which extends to the front of the machine, where it is provided with an upward arm 207 as seen in Fig. 2 with a flanged head 208 straddling gear 120 on the drum. By this arrangement the movements of the drum to the left and right control the positioning and restoring of the impact stop.

As a safety device, shown in Fig. 11, the worm wheel 114 is provided with a pivoted dog 211 engaging a notch 212 in the shaft 115, a spring 213 holding it in position. If by accident the regular drive should be in effect when the slow turning operation is in effect this safety device permits a slip or yield, the shaft 115 and parts between it and the stitching shaft turning faster than the worm wheel 114.

In order to make the construction of the present embodiment of this invention, and its preferred mode of operation, more clear, the sequence of actions will now be set forth. The complete let up of the pedal unlatches the toggle-operating slide or bar 87 after the opening of the driving clutch, as before fully described. This permits the straightened toggle levers to be deflected by the starting spring 90, the strong brake spring 75 thereupon coming into action to apply the brake band to the shaft disk 49. The braking action thus begins at an indeterminate position and it acts with variable friction, according to its adjustment, so that the braking action continues for an indeterminate period and eventually stops the shaft in an indeterminate position. This entire action is without any timing or control whatever, excepting that by tightening up the brake the action can be rendered of reasonably short duration. The entire brake device, including the brake straps and the mountings therefor, yield to an appreciable extent during the braking action. The drag on the parts pulls them forward, the brake bar 67 yielding forwardly as permitted by its spring 72, limited by the slot and pin 68, 69. A spring is not essential as the yield could be through the natural elasticity of the parts or the force of gravity could be used. In any case, after the braking action has ceased, and the shaft comes to momentary rest, the parts react or rebound and throw back to a sufficient extent to be utilized for the further operations. The utilization of this reaction for such purpose is considered to be entirely novel, and may operate in various ways, for example by operating an electric switch or contact, to give control in that way of the subsequent slow turning over of the shaft. The general operation has the advantages of the old hand stopping operation, the shaft being first stopped with minimum shock and then slowly advanced to the desired final position. In this illustrated mechanism the reaction or throw back of the braking device displaces the trigger or latch 144. The finger 150 connected to the front brake lug is the part that springs the trigger. The finger engages in the depression or notch above the web 147 of the trigger and forces the trigger rearward from the Fig. 8 to the Fig. 7 position. The trigger roll 146 turns and allows the trigger quickly to move to the left, this action lifting the finger to its normal level as seen in Fig. 9, through the cam surface 148. The springing of the trigger frees the upright lever 136 with which it is connected, and the spring 140 throws the lever to the left. This left swinging of the trigger control lever first operates the cam 135 to pull down the drum guard 130. This releases the drum 110 and the lever and drum both move to the left in Fig. 2. This lever movement operates also to throw the toggle bar or slide 87 to the left, the toggle thus becoming straightened, which releases the brake, the catch 98 latching the toggle in this position, as seen in Fig. 2. The drum 110, shifting to the left, engages the slow turning clutch, the dog or lug 128 on the drum entering the recess 123 at an indeterminate time. The slow rotation of the drum itself is thus transmitted to the stitching shaft, which is turned forwardly toward the desired final position. In the same movement by which this clutching engagement is effected, and at a point of time after the dog 128 has partly engaged the recess 123, the left hand shifting movement of the drum operates to release the cam follower or roll 164, which has been normally latched down as already explained and shown in Fig. 6. The follower snaps up by the force of spring 174 but it does not actually enter the cam groove 157 unless or until the parts are in suitable position. The follower enters the cam groove at the dwell portion 158. The continued rotation shortly brings the slanting portion 159 of the cam into effect. The follower being stationary the effect is to cam the drum to the right. This first of all unclutches the slow turning clutch 128, 123, at a definite point in the shaft rotation. About the same instant with such unclutching, the shift of the drum effects the unlatching of the impact stop bar 191, as shown in Figs. 3 and 10. This stop bar springs up into the position shown in Fig. 10 and almost instantly the shoulder or notch 191 on the shaft disk 149 contacts against the stop bar. The speed is slow and the impact negligible. The shaft is stopped at an exact position, not merely with the needle fully retracted but with the thread free of the shuttle and tension, and the shoe thereby readily removable. The impact bar is thereupon immediately cammed down by the same lever 200 which unlatched it, and again it becomes latched as seen in Fig. 3. The drum, still camming itself to the right forces the spring pressed lever 136 to the right, by the contact of the drum flange 129 against the upward extension 139. The flange is shown with a small projection or button 186, which causes the lever 136 to be thrown so far to the right as to enable the trigger 144 to be restored by its spring 145 to its normal or set position, indicated in Fig. 8, thus holding the lever 136 to the right, in readiness for a new stopping action. During this restoring movement of the lever 136 it operates through the cam 135 to throw the guard 130 up behind the flange 129 of the drum as seen in Fig. 2, thus resetting the guard in its initial condition. Preferably the drum cam has such a throw as to carry the drum slightly further to the right than indicated in Fig. 2. This movement enables the supplemental or second guard 172 to rise behind the drum flange. This is for the purpose of holding the drum momentarily abnormally to the right, so that as the cam follower 164 is being forced down and out by the cam incline 161, it will be held midway in the cam groove, thus avoiding the tendency to bear against the sides of the groove and wear or round them off. This depressing action of the cam upon its follower causes the latter to be latched down again in the condition seen in Fig. 6. At the exit of the cam is the button, already referred to, which throws the follower down to an excessive extent. This acts through the mechanism seen in Fig. 6 to depress the part 171 connected with the guard 172, so that this guard is at this point of time drawn downwardly to the position seen in Fig. 2 and held there, the drum flange 129 thereupon taking its normal position bearing against the main guard 130 as seen in this figure. This final slight leftward shifting movement of the drum brings the parts back to original position; and the mechanism is in readiness to repeat the described operations after the pedal has been again depressed for stitching and let up for stopping. The entire described actions may take place in a very brief time, within a fraction of a rotation. The attention of the operator is taken entirely off the stopping action so that he can keep his attention upon the work being stitched, and its removal from the machine. The described parts are strong and durable and not subject to undue wear.

It will thus be seen that there has been described a stopping and starting mechanism embodying the principles and attaining the advantages of the present invention. Since many matters of combination, arrangement, design and detail may be modified without departing from the underlying principles it is not intended to limit the invention to such matters except so far as set forth in the appended claims.

What is claimed is:

1. In a high speed power driven machine, a shaft, and a stop mechanism comprising means operative after disconnection of power for bringing the machine shaft to a stop without shock in an indeterminate position, and power operated means coming automatically into action subsequent to the stoppage for turning the shaft to a predetermined stopping position.

2. The combination as in claim 1 and wherein a friction brake constitutes the means for stopping the shaft in an indeterminate position, and the subsequent shaft turning means operates to restart the shaft, turn it slowly to the required position and disengage it for its final stoppage.

3. A stop mechanism comprising a brake arranged to be applied when power is disconnected so as to bring the shaft to a preliminary stop at an indeterminate position, and shaft rotating means automatically put into action by such stoppage for causing the shaft to be rotated to a definite position.

4. A stop mechanism comprising a brake arranged to be applied when power is disconnected to bring the shaft to a stop at an indeterminate position, and means automatically put into action by such stoppage for causing the brake to be released and the shaft restarted and rotated to a definite final position.

5. A stop mechanism comprising a brake arranged to be applied when power is disconnected and thus bring the shaft to a stop at an indeterminate position, a trip device released by reason of such stoppage, and means set in action by such trip device for turning the shaft to a definite position.

6. In combination with means for power driving a shaft, a frictional braking device applicable when the power is disconnected, said device adapted to react upon the cessation of braking action, and means set into action by such reaction for turning the shaft to a definite position.

7. In combination with means for power driving a shaft, a frictional braking device applicable when the power is disconnected, said device adapted to react slightly upon the cessation of braking action, a trip device operated by such reaction, and means set into action by such trip device for turning the shaft to a definite position.

8. In combination with means for power driving a shaft, a frictional braking device applicable when the power is disconnected, said device adapted to react slightly upon the cessation of braking action, and means set into action by such reaction for first disengaging the brake device and then turning the shaft to a definite position.

9. The combination as in claim 6 and wherein the braking device includes a yielding element which is strained by the frictional drag during stoppage and then throws back by an appreciable movement constituting the reaction that sets the subsequent turning into action.

10. In combination with a power driven shaft, a braking device applicable upon the disengagement of power to stop the shaft without shock, a yielding element associated with said device so as to yield during the braking action and then reassert itself, and means controlled by such reasserting action operating to turn the shaft to a definite position.

11. The combination as in claim 10 and wherein the reasserting action operates a trip device to set into action a slow turning mechanism.

12. The combination as in claim 10 and wherein the reasserting action operates a trip device to remove the brake and then set into action a slow turning mechanism.

13. In combination with means for power driving a shaft, a frictional braking device applicable when the power is disconnected, said device adapted to throw back slightly upon the cessation of braking action, and means set into action by such throwing back for turning the shaft to a definite position, and means for there positively stopping it.

14. In combination with a power driven shaft, a braking device applicable upon the disengagement of power to stop the shaft without shock, a yielding element associated with said device so as to yield during the braking action and then reassert itself, and power means controlled by such reasserting action to turn the shaft to a definite position, and there positively stop it.

15. Mechanism as in claim 3 and wherein the mechanism set into action by the preliminary stoppage comprises a member or drum having a slow turning clutch member, a cooperating clutch member, and a cam by which such clutch members are finally disengaged.

In testimony whereof, I have affixed my signature hereto.

JOHN ROGER OLIVER